(12) United States Patent
Tedder et al.

(10) Patent No.: US 6,931,184 B2
(45) Date of Patent: Aug. 16, 2005

(54) DRY TUBE FIBER OPTIC ASSEMBLIES, CABLES, AND MANUFACTURING METHODS THEREFOR

(75) Inventors: Catharina L. Tedder, Catawba, NC (US); Jody L. Greenwood, Hickory, NC (US); Kenneth D. Temple, Jr., Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 55 days.

(21) Appl. No.: 10/448,509

(22) Filed: May 30, 2003

(65) Prior Publication Data

US 2004/0240809 A1 Dec. 2, 2004

(51) Int. Cl.$^7$ ................................................ G02B 6/44
(52) U.S. Cl. ....................................................... 385/109
(58) Field of Search ......................... 385/100–110, 114

(56) References Cited

U.S. PATENT DOCUMENTS

| | | | | |
|---|---|---|---|---|
| 4,915,766 A | * | 4/1990 | Baxter | 156/335 |
| 5,751,881 A | | 5/1998 | Konda et al. | 385/110 |
| 5,845,032 A | | 12/1998 | Konda et al. | 385/110 |
| 6,122,424 A | * | 9/2000 | Bringuier | 385/100 |
| 6,166,099 A | * | 12/2000 | Krupinski | 521/146 |
| 6,399,531 B1 | * | 6/2002 | Job et al. | 502/104 |
| 6,528,548 B2 | * | 3/2003 | Hayashi et al. | 521/79 |
| 6,750,264 B2 | * | 6/2004 | Vo et al. | 521/79 |

OTHER PUBLICATIONS

Dow Plastics, "Resin for Pipe Extrusion and Pipe Fittings" DOW DGDA–2490NT, Mar. 2003.
Equistar, "Advances In HMW–PE Technology", Sep. 2002.
Borealis, "Borstar Jacketing Compounds for Wire & Cable", Apr. 2002.
Göttfert, "Rheo–Tester 2000 the Dual Bore Capillary Rheometer with Expanded Measuring Range", Jan. 1, 2002.
Rogestedt, et al., "A New Generation Polyethylene Resins For cable Jacketing Applications", 1997.
"Molecular Weight", 1995.
"Definitions of Molecular Weight", Sep. 3, 1995.
Equistar, "Alathon® L4907WC High Density Polyethylene Wire and Cable Grade", no date.
Equistar, "Althon® XL5906WC High Density Polyethylene Wire and Cable Grade", no date.
ASTM International, "Standard Test Method for Determination of Properties of Polymeric Materials by Means of a Capillary Rheometer", Admitted Prior Art, no date.
ASTM International, "Standard Test Method for Melt Flow Rates of Thermoplastics by Extrusion Plastometer", Admitted Prior Art, no date.
Lennartsson et al., "A New Generation Of Jacketing Compounds For Wire And Cable Applications", no date.

* cited by examiner

*Primary Examiner*—Javaid H. Nasri
(74) *Attorney, Agent, or Firm*—Michael E. Carroll, Jr.

(57) ABSTRACT

A fiber optic dry tube assembly and a method of manufacturing the same includes at least one optical waveguide and a tube. The tube houses at least a portion of the at least one optical fiber and is formed from a bimodal polymeric material. The tube has an average ovality of about 10 percent or less. In other embodiments, the bimodal polymeric material that forms the tube has a melt index of about 1.0 g/10 minutes or less, a melt strength in the range of about 8 cN to about 35 cN at 190° C,. and/or a polydisperity of about 7 or greater. Additionally, the dry tube assemblies of the present invention can form a portion of a cable.

58 Claims, 4 Drawing Sheets

DRY TUBE FIBER OPTIC ASSEMBLIES, CABLES, AND MANUFACTURING METHODS THEREFOR

FIELD OF THE INVENTION

The present invention relates to dry tube fiber optic assemblies, cables, and manufacturing methods therefore. More specifically, the invention relates to dry tube fiber optic assemblies and cables having a tube formed from a bimodal polymeric material with a predetermined ovality and manufacturing methods therefor.

BACKGROUND OF THE INVENTION

Fiber optic tube assemblies and cables include optical waveguides such as optical fibers that transmit optical signals such as voice, video, and/or data information. Depicted in FIG. 1 is a conventional fiber optic tube assembly 10. Conventional tube assembly 10 includes a plurality optical waveguides 12 in a ribbon format that are disposed within a tube 15 filled with a thixotropic material 14 such as grease. Filling tube 15 with thixotropic material 14 serves several functions. For instance, thixotropic material 14 allows for movement between the optical waveguides and the tube, cushioning of the optical waveguides, coupling of the optical waveguides with the tube, and blocking the migration of water within the tube. Additionally, injecting thixotropic material 14 inside tube 15 during the extrusion of tube 15 around optical waveguides 12 aids in maintaining the shape of tube 15. In other words, injecting thixotropic material 14 to fill tube 15 helps tube 15 maintain its desired shape before the tube 15 is cooled. Without injecting thixotropic material 14, the tube would tend to deform before cooling.

On the other hand, thixotropic materials have drawbacks. One such drawback is that they must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the tube at relatively high temperatures or the thixotropic materials may cause optical attenuation at relatively low temperatures. Thus, cable designs have attempted to eliminate thixotropic materials from the tube, but it has been a difficult task because the thixotropic material performs many functions. One design that eliminates the thixotropic material from the tube is U.S. Pat. No. 4,909,592, which discloses a tube having water-swellable tapes and/or yarns disposed therein. This design requires a large number of water-swellable components within the tube, which makes the design relatively expensive. Additionally, with the elimination of the thixotropic material the tube is likely to deform or collapse before cooling. This deformation of the tube is not addressed by the patent and can cause numerous problems. Problems caused by tube deformation include increased optical attenuation, decreased tube crush strength, kinking of the tube, non-uniform jacket thickness over the tube, larger cable diameters, and difficulties in stranding the tube about a central member.

SUMMARY OF THE INVENTION

The present invention is directed to a fiber optic dry tube assembly including at least one optical waveguide and a tube. The tube having at least a portion of the at least one optical fiber therein. The tube is formed from a bimodal polymeric material and has an average ovality of about 10 percent or less.

The present invention is also directed to a fiber optic dry tube assembly including at least one optical fiber and a tube. The tube having at least a portion of the at least one optical fiber and a water-swellable material therein. The tube is formed from a bimodal polyethylene and has an average ovality of about 10 percent or less.

The present invention is further directed to a dry fiber optic cable including at least one optical fiber, a tube, and a cable jacket. The tube having at least a portion of the at least one optical fiber therein. The tube is formed from a bimodal polymeric material and having an average ovality of about 10 percent or less.

Additionally, the present invention is directed to a method of manufacturing a fiber optic dry tube assembly. The method includes the steps of paying off at least one optical waveguide, and extruding a tube around at least a portion of the at least one optical waveguide. The tube is formed from a bimodal polymeric material and has an average ovality of about 10 percent or less.

BRIEF DESCRIPTION OF THE FIGS.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
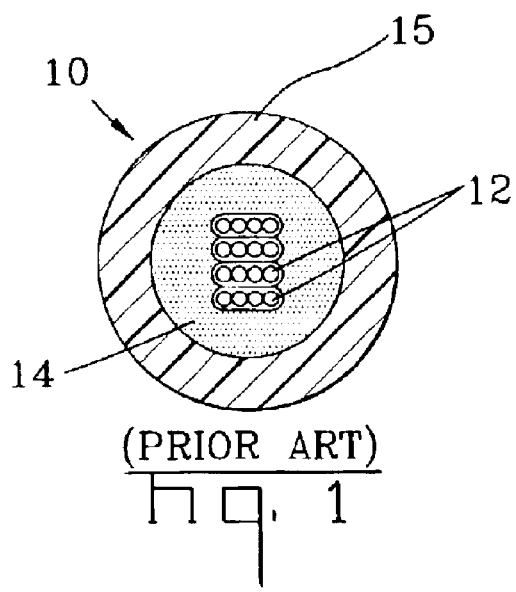
FIG. 1 is a cross-sectional view of a conventional optical fiber tube assembly.
Figure 2:
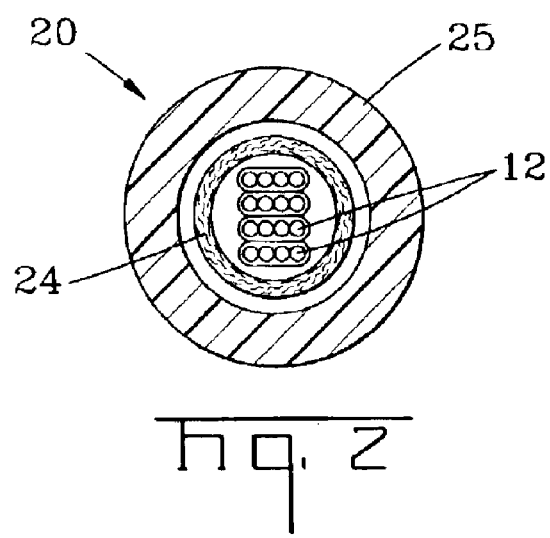
FIG. 2 is a cross-sectional view of a dry fiber optic tube assembly according to the present invention.
Figure 3:
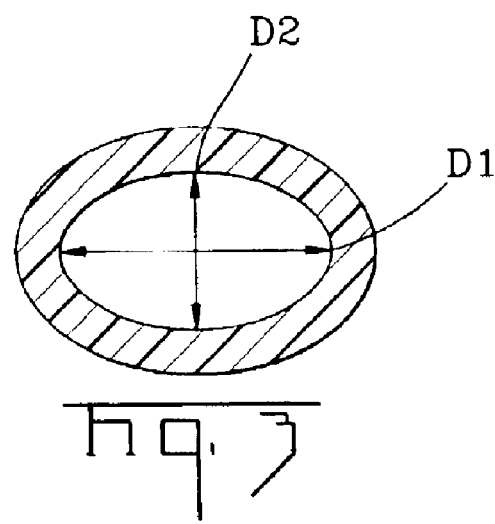
FIG. 3 is a cross-sectional view of a tube that depicts a major and a minor diameter used for calculating the ovality of the tube.

FIG. 2 depicts a fiber optic dry tube assembly 20 according to the present invention having at least one optical waveguide 12 and a water-swellable material 24 disposed within a tube 25. Tube 25 is formed from a bimodal polymeric material. Bimodal polymeric materials of the present invention include materials having at least a first polymer material having a relatively high molecular weight and a second polymer material having a relatively low molecular weight that are manufactured in a specific process. Specifically, bimodal polymeric materials include a first polymeric material having molecular weight in a range of about $4.5 \times 10^4$ to about $6.5 \times 10^6$ and a second polymeric material having a molecular weight in a range of about $1.0 \times 10^2$ to about $1.1 \times 10^5$ measured using gel permeation chromatography (GPC). Preferably, the molecular weight of the first polymeric material is in a range of about $9.0 \times 10^4$ to about $6.5 \times 10^6$ and the molecular weight of the second polymeric material is in a range of about $4.0 \times 10^2$ to about $9.5 \times 10^4$. Additionally, other bimodal materials can include materials having more than a first and a second material therein. Using a bimodal polymeric material for tube 25 allows for relatively low ovality at relatively high line speeds without the use of a thixotropic material inside the tube for maintaining its shape. As used herein, ovality is the difference between a major diameter d1 and a minor diameter d2 of tube 25 (FIG. 3) divided by major diameter d1 and multiplied by a factor of one-hundred, thereby expressing ovality as a percentage. In one embodiment, tube 25 has an average ovality of about 10 percent or less.

Figure 4:
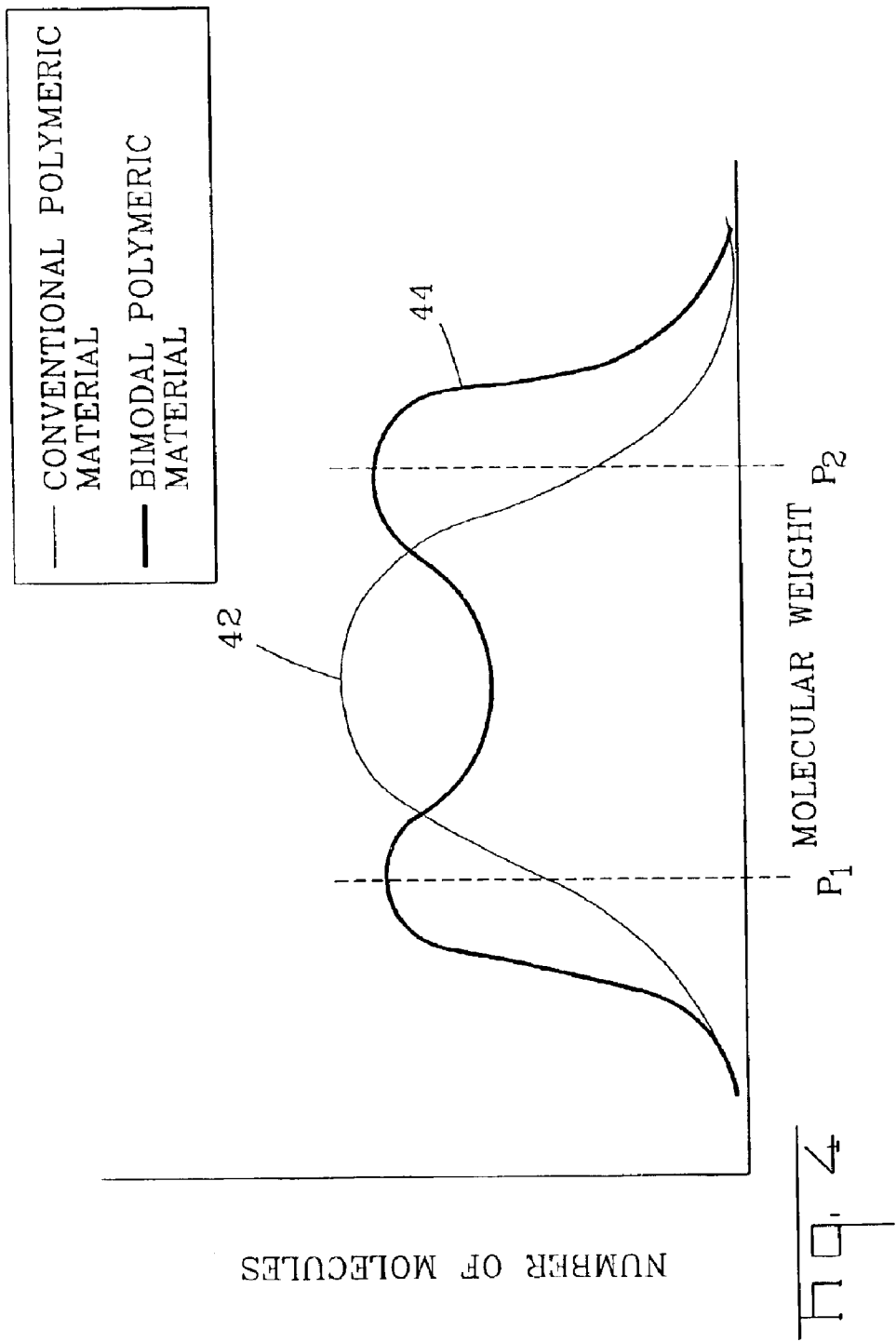
FIG. 4 is a graph depicting the molecular weight distributions of a conventional polymeric material and an exemplary bimodal polymeric material according to the present invention.

Bimodal polymeric materials preferably include at least a first polymeric material having a relatively high molecular weight and a second polymeric material having a lower molecular weight. Bimodal polymeric materials of the present invention are formed in a dual reactor process. This dual reactor process provides the desired material properties and should not be confused with simple post reactor polymer blends that compromise the properties of both resins in the blend. By way of example, the dual reactor process has a loop reactor and a gas phase reactor operating in phase, thereby producing a bimodal polymeric material. FIG. 4 illustrates graph depicting the molecular weight distributions of a conventional polymeric material and an exemplary bimodal polymeric material according to the present invention. Specifically, curve 42 depicts a molecular weight distribution of a conventional polymeric material. On the other hand, curve 44 depicts a molecular weight distribution of a bimodal polymeric material having a first and a second polymer material formed in a dual reactor process. As shown, curve 44 has two peaks $P_1, P_2$ that represent the first and second polymer materials. Furthermore, other bimodal polymeric materials can have a curve with other suitable molecular weight distributions.

Generally speaking, the molecular weight of a polymer chain correlates with the length of the polymer chain. In other words, a longer chain of a polymer molecule generally results in a higher molecular weight of the polymer molecule. Thus, the first polymer material has a relatively high molecular weight and a relatively long molecular chain compared with the smaller molecular weight and shorter polymer chain of the second polymer material. The use of bimodal material manufactured using the dual reactor process provides unique properties during extrusion so that a dry tube assembly 20 can be manufactured at relatively high line speeds while maintaining its intended shape and/or ovality tolerance.

Specific peaks of bimodal materials of the present invention are measured using GPC with the following parameters.

Measuring Machine: 150-C ALC/GPC manufactured by Waters, Inc. using Sigma Ultratek GPC software.

Solvent: 1,2,4-trichlorobenzene (TCB) with 0.1% (volume by weight) of V-pheny-2-naphthylamine as an antioxidant.

Column: Gel DVB Mixed bed column, 50 cm×10 mm (ID) manufactured by Jordi.

| | |
|---|---|
| Test Temperature: | 145° C. |
| Concentration: | 1.5 mg/ml |
| Flow rate: | 1.2 ml/min |
| Standard sample: | Polystyrene |
| Injection volume: | 150 µl |

The bimodal polymeric materials of the present invention generally maintain their shape during the extrusion process because they have melt strength, rather than being filled with a thixotropic material. Melt strength is the ability of a molten material to be shaped, for example, taffy has melt strength because it can be pulled and shaped while molten, whereas water has no melt strength because it cannot be shaped. Bimodal polymeric materials of the present invention have melt strength since the shorter polymer chains of the second polymeric material melt before the longer polymer chains of the first polymeric material. This melting of the second polymeric material lubricates the mass of the bimodal polymeric material, thereby easing the sliding of the large molecules of the first polymeric material even if they are slightly entangled with other molecules. Stated another way, entanglement is a wrapping of the polymer chains around each other, and longer polymer chains imply more entanglement between molecules. It is this slight entanglement of the molecules of the first polymeric material during extrusion that gives the bimodal polymeric material its melt strength and ability to maintain its intended shape during the extrusion process.

Bimodal polymeric materials of the present invention preferably have a melt strength in the range of about 8 centiNewtons (cN) to about 35 cN at 190° C. More preferably, the melt strength is in the range of about 10 cN to about 30 cN at 190° C. and, most preferably, in the range of about 12 cN to about 25 cN at 190° C. However, bimodal polymeric materials having other suitable ranges of melt strength can also be used. The melt strength is measured using a Rhoe-Tester 2000 capillary rheometer equipped with a Rheotens unit both commerically available from Gottfert Werkstoff-Prufmaschinen, GMBH of Buchen/Odenwald, Germany. Additionally, the melt strength of a material is measured using standard wheels, a gap of 0.4 mm between the wheels and the die, an acceleration of 2.4 mm/s², a piston diameter of 9.5 mm, a piston speed of 0.423 mm/s, a die having a length of 41.9 and an inner diameter of 2.1 mm, a shear rate of 33.0 s⁻¹, and a strand length of 100.0 mm.

Furthermore, other characteristics can be used to specify bimodal polymeric materials of the present invention. For instance, the molecular weight of a polymer such as a polyethylene generally corresponds to the melt index of the polyethylene. Melt index estimates the ease of melting a polyethylene and the flow rates associated therewith and can be determined using ASTM D1238. More particularly, melt index of a polyethylene is generally inversely proportional to the average molecular weight of the material. ASTM D1238 requires filling a barrel with the polymeric material being tested and heating to a temperature of 190° C. Then a load of 2160 grams is placed on a piston that cooperates with the barrel to force the polyethylene through a capillary die. Flow rates are measured in units of grams per 10 minutes (g/10 min.). Bimodal polymeric materials such as polyethylenes of the present invention have a melt index in the range of about 0.01 to about 1.0, more preferably less than about 0.5, and most preferably less than about 0.1. Additionally, different materials can use similar tests that vary the heating temperature and/or the load applied and then measure the amount of material through the capillary die in grams per 10 minutes. These similar tests for other materials yield a melt flow rate and are run under specific conditions of temperature and pressure for the type of polymer being tested. For instance, polypropylene uses a melt flow rate test, rather than a melt index test, which is performed at a temperature 230° C. and a load of 2160 grams.

The bimodal polymeric materials of the present invention can also be specified by polydispersity. Polydispersity ($M_w/M_n$) is a measure of the broadness of the molecular weight distribution and is defined as the ratio between a weight average molecular weight ($M_w$) and number average molecular weight ($M_n$). The weight average molecular weight ($M_w$) is defined as:

$$M_w = \frac{\sum_i NiMi^2}{\sum_i NiMi} \quad (1)$$

The number average molecular weight is defined as:

$$M_n = \frac{\sum_i NiMi}{\sum_i Ni} \quad (2)$$

where:
$N_I$-number of molecules with mass $M_I$
$M_i$-mass of molecule

The weight average molecule weight ($M_w$) is the sum of the squares of the weights divided by the sum of the molecular weights. On the other hand, the weight average molecular weight ($M_n$) is the sum of the molecular weights divided by the total number of molecules and represents a simple average. Polydispersity is a way to calculate the molecular weight distribution of a bimodal material. For instance, if all of the molecules of a polymer material had the same weight, i.e. were the same, then the polydispersity would equal 1.0. In other words, the greater the value of polydispersity ($M_w/M_n$) the broader the distribution of the molecular weight distribution. Bimodal materials of the present invention preferably have a polydispersity of about 7 or greater, more preferably about 10 or greater; however, other suitable ranges of polydisperisty can be used with the concepts of the present invention.

As depicted, optical waveguide 12 is an optical fiber that is a portion of an optical fiber ribbon. In this case, the optical waveguides are a plurality of single-mode optical fibers in a ribbon format that form a portion of a ribbon stack. The ribbon stack can include helical or S-Z stranding. Additionally, other types or configurations of optical waveguides can be used. For example, optical waveguide 12 can be multi-mode, pure-mode, erbium doped, polarization-maintaining fiber, or other suitable types of light waveguides. Moreover, optical waveguide 12 can be loose or in bundles. Each optical waveguide 12 may include a silica-based core that is operative to transmit light and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. Optical waveguide 12 can also include an identifying means such as ink or other suitable indicia for identification. Suitable optical fibers are commercially available from Corning Incorporated of Corning, New York.

Additionally, fiber optic dry tube assemblies of the present invention should not be confused with tube assemblies filled with thixotropic materials. Fiber optic dry tube assemblies generally exclude a thixotropic material that completely fills the tube; however, lubricants such as thixotropic materials can be used on and/or between optical waveguides such as ribbons of a ribbon stack to allow relative sliding therebetween.

By way of example, two tubes were extruded using the same extrusion tooling (tip and die) and line speed with two different types of polymeric materials to illustrate the concepts of the present invention. The first material was a conventional polypropylene having a melt flow rate of about 4 grams per 10 minutes. The conventional polypropylene was extruded into a tube (without optic waveguides and water-swellable materials therein) using a set-up having calibration plates. The calibration plates are a series of plates disposed after the extruder that aid in maintaining the extruded shape, i.e., improve ovality, of the tube during manufacture. The average major and minor diameters of the polypropylene tube were measured respectively as 9.1 mm and 7.9 mm. Thus, the average ovality of the conventional polypropylene tube was about 13 percent. All things being equal, without the calibration plates the ovality result of the conventional polypropylene would be worse. A typical average ovality for a conventional thixotropic filled tube assembly is about 3 percent or less. Thus, the average ovality of a polypropylene tube in a dry tube assembly greatly increases compared with the average ovality of a thixotropic filled polypropylene tube.

On the other hand, a bimodal polymeric material using the same tip and die tooling and line speed, but without calibration plates was extruded into a tube. Specifically, the material was a high-density polyethylene (HDPE) available from Equistar Chemical, LP of Houston, Tex. under the tradename XL 5906WC having a melt index of about 0.06 g/10 min. The major and minor diameters of the polyethylene tube according to the present invention were measured respectively as 9.3 mm and 8.7 mm. Thus, the ovality of the conventional polyethylene tube was about 6 percent. Thus, the HDPE according to the present invention had a surprising result of about one-half of the ovality of the polypropylene tube without the use of calibration plates to aid in holding the extruded shape. Moreover, the elimination of the calibration plates reduces the cost and complexity of the manufacturing line.

Additionally, using a bimodal HDPE for the tube improves properties such as environmental stress cracking resistance (ESCR) and shrinkage compared with a conventional HDPE while maintaining strength and crush resistance. In other words, increasing polyethylene density generally increases shrinkage and susceptibility to ESCR. However, by using a bimodal HDPE the properties of the first and second materials can be balanced to maintain good processability, ESCR, and mechanical properties. For instance, the relatively long polymer chains of the first material provide melt strength for maintaining an intended shape and the shorter polymer chains of the second material improve processability of the material.

The concepts of the present invention can also be practiced with other suitable bimodal polymeric materials besides HDPE. Other suitable bimodal polyethylene materials include low-density polyethylene (LDPE), linear low-density polyethylene (LLDPE) and medium-density polyethylene (MDPE). The concepts may also be practiced with materials such as a polypropylene (PP), a polyvinylchloride (PVC), a thermoplastic polyurethane (TPU), a thermoplastic elastomer (TPE), a thermoplastic vulcanizate (TPV), polyvinylidene fluoride (PVDF), ethylene vinyl acetate (EVA), ethylene acrylic acid copolymer (EAA), and thermoplastic olefin elastomer (TPO).

In the embodiment of FIG. 2, water-swellable material 24 is a water-swellable tape; however, any other suitable configurations of water-swellable material 24 can be used such as yarns, powders, or a coating on the tube wall. Additionally, other suitable dry tube assemblies can employ the concepts of the present invention. For instance, other configuration of dry tube assemblies include assemblies only containing optical fibers or ribbons in the tube, intermittent plugs within the tube, tubes having necked down portions, or combinations thereof.

Figure 5:
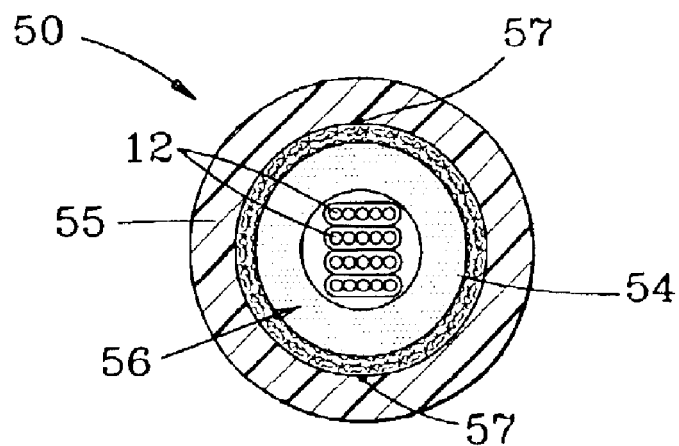
FIG. 5 is a cross-sectional view of another dry fiber optic tube assembly according to the present invention.

FIG. 5 is another dry tube assembly 50 according to the present invention that uses a dry insert 54 as disclosed in U.S. patent application Ser. No. 10/326,022, the disclosure of which is incorporated herein by reference. Dry insert 54 includes one or more layers, and in preferred embodiments dry insert 54 includes a foam layer and a water-swellable layer that generally surround a ribbon stack secured by at least one binder thread 57, thereby forming a core 56. Core 56 is at least partially disposed within tube 55. Foam layer of the dry-insert is preferably a compressible tape that assists in coupling the at least one optical fiber with the tube. Other embodiments include attaching or bonding a portion of dry insert 54 with tube 55. For example, adhesives, glues, elastomers, and/or polymers 58 are disposed on at least a portion of the surface of dry insert 54 that contacts tube 55 for attaching dry insert 54 to tube 55.

Figure 7:
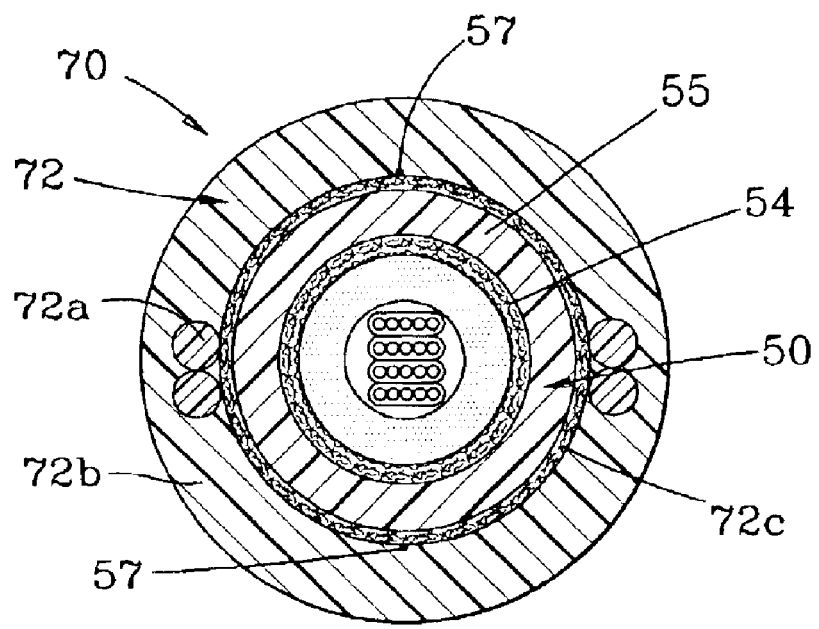
FIG. 7 is a cross-sectional view of a fiber optic cable, using the dry fiber optic tube assembly of FIG. 5, according to the present invention.
Figure 6:
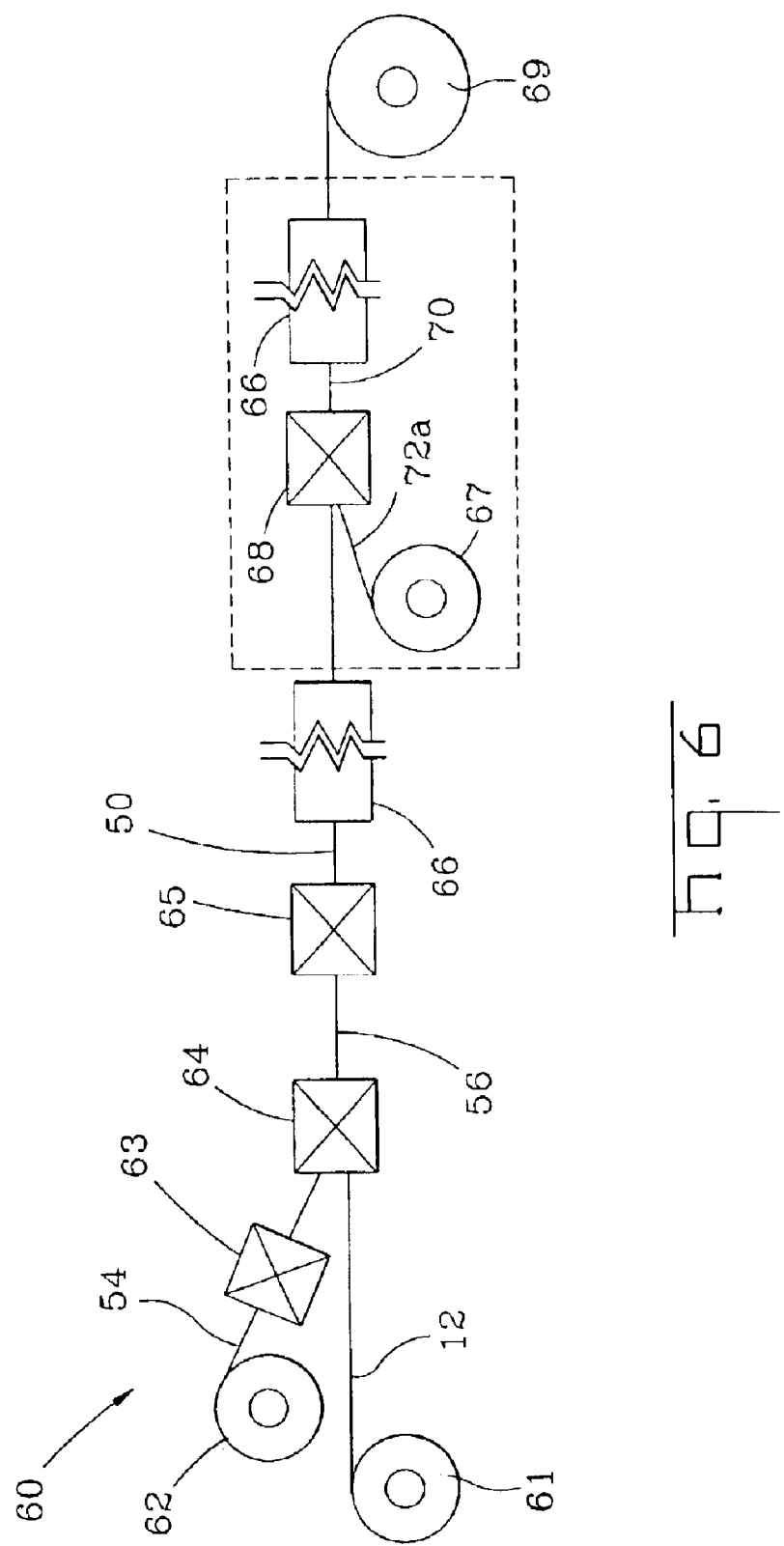
FIG. 6 is a schematic representation of a manufacturing line according to the present invention.

FIG. 6 schematically illustrates an exemplary manufacturing line 60 for tube assembly 50 according to the present invention. Manufacturing line 60 includes at least one optical waveguide payoff reel 61, a dry insert/water-swellable material payoff reel 62, an optional compression station 63, a binding station 64, a cross-head extruder 65, a water trough 66, and a take-up reel 69. Additionally, tube assembly 50 may have a sheath 72 therearound, thereby forming a cable 70 as illustrated in FIG. 7. Sheath 72 can include strength members 72a and a jacket 72b, which can be manufactured on the same line as tube assembly 50 or on a second manufacturing line. The exemplary manufacturing process includes paying-off at least one optical waveguide 12 and dry insert 54 from respective reels 61 and 62. Of course, other embodiments can include paying off, or applying, a water-swellable material from reel 62, rather than a dry insert. Additionally, only one payoff reel for optical waveguide 12 and dry insert 54 are shown for clarity; however, the manufacturing line can include any suitable number of payoff reels to manufacture tube assemblies and cables according to the present invention. Next, dry insert 54 may be compressed to a predetermined height h at compression station 63 and generally positioned around optical waveguide 12, then binding station wraps a binding thread 57 around dry insert 54, thereby forming a core 56. Thereafter, core 56 is fed into cross-head extruder 65 where tube 55 is extruded about core 56, thereby forming tube assembly 50. Tube 55 is then quenched in water trough 66 and then tube assembly 50 is wound onto take-up reel 69. As depicted in the dashed box, if one manufacturing line is set-up to make cable 70, then strength members 72a are paid-off reel 67 and positioned adjacent to tube 55, and jacket 72b is extruded about strength members 72a and tube 55 using cross-head extruder 68. Thereafter, cable 70 passes into a second water trough 66 before being wound-up on take-up reel 69. Furthermore, other cables and/or manufacturing lines according to the concepts of the present invention are possible. For instance, cables and/or manufacturing lines may include a water-swellable tape 72c secured with at least one binder thread 57 and/or an armor between tube 55 and strength members 72a; however, the use of other suitable cable components are possible.

Furthermore, other extrusion set-ups can help improve ovality of the tube; however, they may slow down the manufacturing line speed, thereby having an economic impact. Tubes of the present invention have an average ovality of about 10 percent or less, preferably about 7 percent or less, and more preferably about 5 percent or less. Nonetheless, ovality can be balanced with other factors for obtaining a predetermined average ovality for a desired linespeed. For example, calibration plates can be used in the extrusion process for improving ovality; however, they add cost and complexity to the manufacturing process. Likewise, the extrusion process can include a vacuum sizing for improving average ovality, but this process requires a slower linespeed. However, the present inventors have discovered that all things being equal bimodal polymeric materials of the present invention provide improved average ovality in dry tube assemblies.

Illustratively, an experiment was performed to compare the average ovalities of a bimodal polymeric material with a conventional MDPE having a broad molecular weight distribution using the same manufacturing parameters. FIG. 4 generally represents the molecular weight distributions of the two tested materials. The bimodal polymeric material was a HDPE, specifically, XL 5906WC. The MDPE material was sold by Union Carbide Corporation of Danbury, Connecticut under the tradename DHDA 8864. Both materials were manufactured into the dry tube assembly design of FIG. 5 with respective nominal tube ID/OD of 9.0 mm/11.6 mm at a line speed of 40 m/min. using calibration plates. Three dry tube assemblies of each material were manufactured and each dry tube assembly was measured for ovality in five different locations in order to calculate an average ovality for each dry tube assembly. Additionally, a run average was calculated from the three trials for comparison purposes. The results are presented below in Table 1.

TABLE 1

| Trial | Bimodal Polymeric Material | MDPE |
| --- | --- | --- |
| Run 1 | 4.0% | 14.6% |
| Run 2 | 8.9% | 10.5% |
| Run 3 | 9.6% | 12.0% |
| Run Average | 7.5% | 12.4% |

As shown, all things being equal, the bimodal polymeric materials of the present invention provide a significant improvement in average ovality for dry tube applications. Specifically, the experiment surprisingly shows nearly a forty-percent improvement in ovality for the run average in this dry tube assembly design. Additionally, as the dry tube diameter increases the difference between the average ovality of a bimodal polymeric material and a conventional material generally increases. This is due to the fact that the average ovality of a dry tube assembly made from conventional materials generally increases as the tube diameter increases. In other words, a bigger dry tube using conventional materials is more likely to deform during the manufacturing process. Additionally, other dry tube designs using the concepts of the present invention can improve tube ovality, thereby improving cable characteristics.

Many modifications and other embodiments of the present invention, within the scope of the appended claims, will become apparent to a skilled artisan. For instance, tube assemblies can include configurations with other components such as strength members, ripcords, embedded water-swellable materials, armor, electrical components, or other suitable components. Additionally, the concepts of the present invention are useful with other cable configurations besides monotube, such as stranded tube configurations. For instance, the embodiments of FIG. 2 or 5 can be stranded about a central member. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides and/or fiber optic cable configurations as well.

That which is claimed:

1. A fiber optic dry tube assembly comprising:
   at least one optical waveguide;
   a tube, the tube housing at least a portion of the at least one optical waveguide, wherein the tube is formed from a bimodal polymeric material and has an average ovality of about 10 percent or less.

2. The fiber optic dry tube assembly of claim 1, the tube having an average ovality of about 7 percent or less.

3. The fiber optic dry tube assembly of claim 1, the tube having an average ovality of about 5 percent or less.

4. The fiber optic dry tube assembly of claim 1, the bimodal polymeric material having a melt index of about 1.0 g/10 minutes or less.

5. The fiber optic dry tube assembly of claim 1, the bimodal polymeric material being a polyethylene.

6. The fiber optic dry tube assembly of claim 5, the polyethylene being selected from the group consisting of a high-density polyethylene, a medium-density polyethylene, a low-density polyethylene, and a linear low-density polyethylene.

7. The fiber optic dry tube assembly of claim 1, the bimodal polymeric material being selected from the group consisting of a polypropylene (PP), a polyvinylchloride (PVC), a thermoplastic polyurethane (TPU), a thermoplastic elastomer (TPE), a thermoplastic vulcanizate (TPV), and polyvinylidene fluoride (PVDF).

8. The fiber optic dry tube assembly of claim 1, the at least one optical waveguide being a portion of a ribbon stack.

9. The fiber optic dry tube assembly of claim 1, the fiber optic dry tube assembly being a portion of a cable.

10. The fiber optic dry tube assembly of claim 1, further comprising a water-swellable material within the tube.

11. The fiber optic dry tube assembly of claim 10, the water-swellable material being a portion of a dry insert that is compressible for assisting coupling between the at least one optical fiber and the tube.

12. The fiber optic dry tube assembly of claim 11, the dry insert being attached to the tube.

13. The fiber optic dry tube assembly of claim 1, the bimodal polymeric material having a polydisperity of about 7 or greater.

14. The fiber optic dry tube assembly of claim 1, the bimodal polymeric material having a polydisperity of about 10 or greater.

15. The fiber optic dry tube assembly of claim 1, the bimodal polymeric material having a melt strength in the range of about 8 cN to about 35 cN at 190° C.

16. A fiber optic dry tube assembly comprising:
    at least one optical fiber;
    a tube, the tube housing at least a portion of the at least one optical fiber and a water-swellable material, wherein the tube is formed from a bimodal polyethylene and has an average ovality of about 10 percent or less.

17. The fiber optic dry tube assembly of claim 16, the tube having an average ovality of about 7 percent or less.

18. The fiber optic dry tube assembly of claim 16, the tube having an average ovality of about 5 percent or less.

19. The fiber optic dry tube assembly of claim 16, the bimodal polymeric material having a melt index of about 1.0 g/10 minutes or less.

20. The fiber optic dry tube assembly of claim 16, the polyethylene being selected from the group consisting of a high-density polyethylene, a medium-density polyethylene, a low-density polyethylene, and a linear low-density polyethylene.

21. The fiber optic dry tube assembly of claim 16, the at least one optical fiber being a portion of a fiber optic ribbon stack.

22. The fiber optic dry tube assembly of claim 16, the water-swellable material being a portion of a dry insert that is compressible for assisting coupling between the at least one optical fiber and the tube.

23. The fiber optic dry tube assembly of claim 22, the dry insert being attached to the tube.

24. The fiber optic dry tube assembly of claim 16, the fiber optic dry tube assembly being a portion of a cable.

25. The fiber optic dry tube assembly of claim 16, the bimodal polymeric polyethylene having a polydisperity of about 7 or greater.

26. The fiber optic dry tube assembly of claim 16, the bimodal polymeric polyethylene having a polydisperity of about 10 or greater.

27. The fiber optic dry tube assembly of claim 16, the bimodal polymeric material having a melt strength in the range of about 8 cN to about 35 cN at 190° C.

28. A dry fiber optic cable comprising:
    at least one optical fiber;
    a tube, the tube housing at least a portion of the at least one optical fiber, wherein the tube is formed from a bimodal polymeric material and having an average ovality of about 10 percent or less; and
    a cable jacket.

29. The dry fiber optic cable of claim 28, the tube having an average ovality of about 7 percent or less.

30. The dry fiber optic cable of claim 28, the tube having an average ovality of about 5 percent or less.

31. The dry fiber optic cable of claim 28, the bimodal polymeric material having a melt index of about 1.0 g/10 minutes or less.

32. The dry fiber optic cable of claim 28, the bimodal polymeric material being a polyethylene.

33. The dry fiber optic cable of claim 28, the polyethylene being selected from the group consisting of a high-density polyethylene, a medium-density polyethylene, a low-density polyethylene, and a linear low-density polyethylene.

34. The dry fiber optic cable of claim 28, the bimodal polymeric material being selected from the group consisting of a polypropylene (PP), a polyvinylchloride (PVC), a thermoplastic polyurethane (TPU), a thermoplastic elastomer (TPE), a thermoplastic vulcanizate (TPV), and polyvinylidene fluoride (PVDF).

35. The dry fiber optic cable of claim 28, the at least one optical fiber being a portion of a fiber optic ribbon stack.

36. The dry fiber optic cable of claim 28, further comprising a water-swellable material within the tube.

37. The fiber optic dry tube assembly of claim 36, the water-swellable material being a portion of a dry insert that is compressible for assisting coupling between the at least one optical fiber and the tube.

38. The fiber optic dry tube assembly of claim 37, the dry insert being attached to the tube.

39. The fiber optic dry tube assembly of claim 28, the bimodal polymeric material having a polydisperity of about 7 or greater.

40. The fiber optic dry tube assembly of claim 28, the bimodal polymeric material having a polydisperity of about 10 or greater.

41. The fiber optic dry tube assembly of claim 28, the bimodal polymeric material having a melt strength in the range of about 8 cN to about 35 cN at 190° C.

42. A method of manufacturing a fiber optic dry tube assembly comprising the steps of:

paying off at least one optical waveguide; and extruding a tube around at least a portion of the at least one optical waveguide, wherein the tube is formed from a bimodal polymeric material and has an average ovality of about 10 percent or less.

43. The method of claim 42, the step of extruding the tube wherein the tube has an average ovality of about 7 percent or less.

44. The method of claim 42, the step of extruding the tube wherein the tube has an average ovality of about 5 percent or less.

45. The method of claim 42, the step of extruding the tube wherein the bimodal polymeric material has a melt index of about 1.0 g/10 minutes or less.

46. The method of claim 42, the step of extruding the tube wherein the bimodal polymeric material is a polyethylene.

47. The method of claim 46, the polyethylene being selected from the group consisting of a high-density polyethylene, a medium-density polyethylene, a low-density polyethylene, and a linear low-density polyethylene.

48. The method of claim 42, the bimodal polymeric material being selected from the group consisting of a polypropylene (PP), a polyvinylchloride (PVC), a thermoplastic polyurethane (TPU), a thermoplastic elastomer (TPE), a thermoplastic vulcanizate (TPV), and polyvinylidene fluoride (PVDF).

49. The method of claim 42, the at least one optical waveguide being a portion of a ribbon stack.

50. The method of claim 42, further comprising paying off a water-swellable material that is disposed about the at least one optical waveguide.

51. The method of claim 50, the water-swellable material being a portion of a dry insert that is compressed for assisting coupling between the at least one optical fiber and the tube.

52. The method of claim 51, further comprising the step of attaching the dry insert to the tube.

53. The method of claim 42, further comprising the step of placing at least one dry insert adjacent to the at least one optical waveguide, thereby forming a core.

54. The method of claim 53, further comprising the step of securing the core with a binder thread.

55. The method of claim 42, further comprising the steps of placing at least one strength member adjacent to the tube and extruding a jacket therearound, thereby forming a fiber optic cable.

56. The method of claim 42, the bimodal polymeric material having a polydisperity of about 7 or greater.

57. The method of claim 42, the bimodal polymeric material having a polydisperity of about 10 or greater.

58. The method of claim 42, the bimodal polymeric material having a melt strength in the range of about 8 cN to about 35 cN at 190° C.

\* \* \* \* \*